March 29, 1960 W. C. GLEISNER, JR 2,930,292
MACHINE TOOL ELEVATING MECHANISM
Filed Nov. 12, 1957 2 Sheets-Sheet 1

INVENTOR.
William C. Gleisner, Jr.
BY
Attorney

March 29, 1960 W. C. GLEISNER, JR 2,930,292
MACHINE TOOL ELEVATING MECHANISM
Filed Nov. 12, 1957 2 Sheets-Sheet 2

INVENTOR.
William C. Gleisner, Jr.
BY
Elroy J. Wutschel
Attorney

United States Patent Office 2,930,292
Patented Mar. 29, 1960

2,930,292

MACHINE TOOL ELEVATING MECHANISM

William C. Gleisner, Jr., Lisbon, Wis., assignor to Kearney & Trecker Corporation, West Allis, Wis., a corporation of Wisconsin Application November 12, 1957, Serial No. 695,947

3 Claims. (Cl. 90—58)

This invention relates to machine tools and more particularly to an improved elevating mechanism for the vertically movable work supports of a knee and column type milling machine.

The principal object of this invention is to provide an improved elevating mechanism that is operative to resist torsional deflection of the vertically movable work supports of a knee and column type milling machine.

Another object of the invention is to provide improved means for synchronizing a pair of spaced apart translating mechanisms operative to effect vertical movement of a milling machine work support.

Another object is to provide a pair of spaced apart motor driven elevating mechanisms in combination with improved synchronizing means.

A further object of the invention is to provide an improved elevating mechanism of greatly simplified construction in a knee and column type milling machine.

A still further object of the invention is to provide an improved positioning mechanism for the vertically movable knee of a knee and column type milling machine.

According to this invention, a milling machine is provided with a vertically upstanding column having a forwardly projecting base to which are secured at their lower ends a pair of elevating screws extending upwardly in spaced apart parallelism. A knee slidably carried by the column above the base, in turn carries a transversely movable saddle that slidably supports a longitudinally reciprocable worktable. A pair of vertically disposed, spaced apart tubular nut journalled within the knee are connected to threadedly engage the upwardly extending elevating screws fixedly secured to the column base. Power for effecting vertical movement is derived from a pair of electric motors carried within the knee and respectively disposed to encircle the cooperating screw and nut assemblies, with the motor rotors being secured directly to the tubular nuts. An electric circuit is connected to simultaneously energize the two knee motors which are maintained in synchronism for effecting equalized vertical knee movement by means of mechanical interconnecting means contained within the knee. The mechanical interconnecting means are adapted primarily to maintain a properly timed relationship for synchronism between the spaced apart elevating mechanisms as the knee is elevated or lowered along the upstanding column structure. By means of this arrangement, each of the separate elevating mechanism drive motors is approximately one-half the rated power of a single motor that would be required to effect vertical adjustment of an identical size knee and work supporting structure.

The foregoing and other objects of the invention which will become more fully apparent from the following detailed description of mechanisms exemplifying preferred embodiments thereof, may be achieved by the apparatus described herein in connection with the accompanying drawings, in which.

While the apparatus is shown and disclosed in a knee and column type milling machine as constituting a preferred embodiment of an improved elevating mechanism, it is to be understood that the various novel features of the invention may be used with equal advantage in other types of machine tools.

Figure 1:
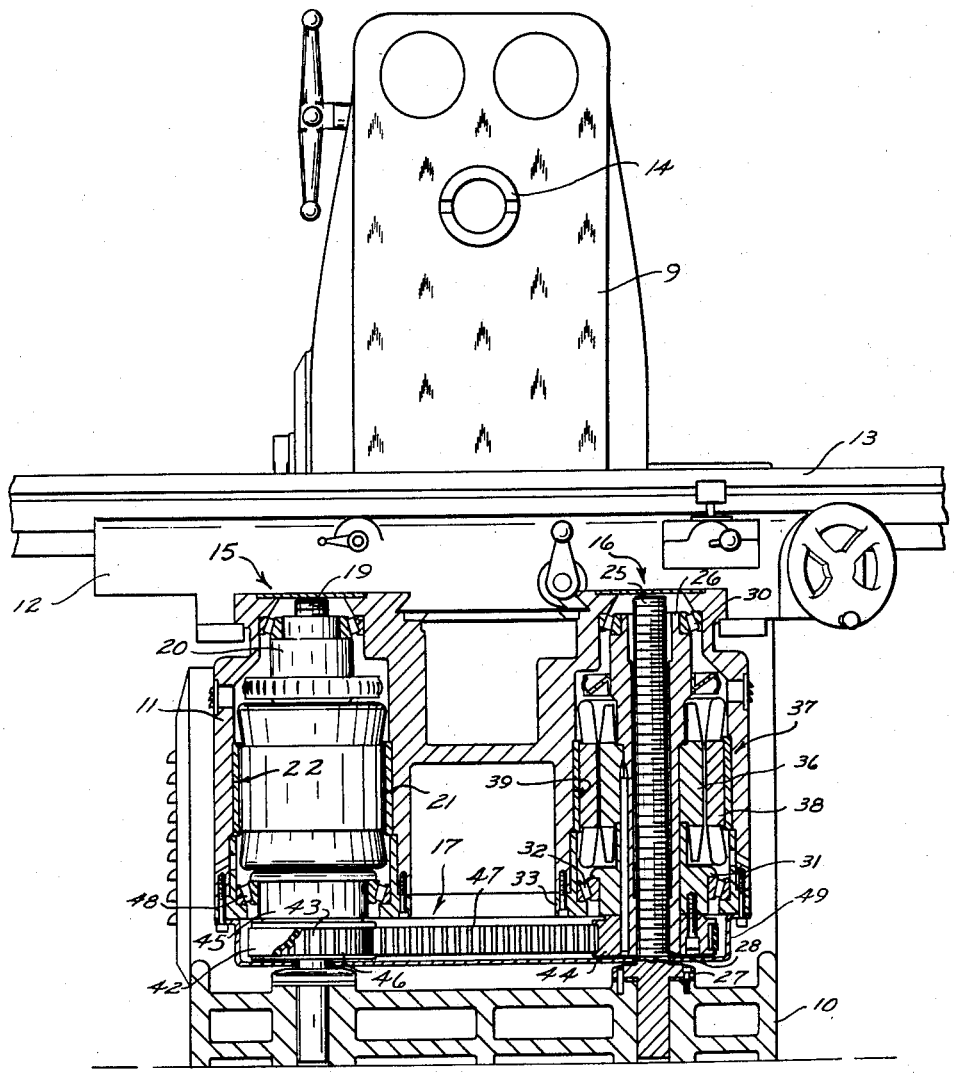
Figure 1 is a view partly in front elevation of a knee and column type milling machine, and partly in longitudinal vertical section to show a portion of the internal mechanism.

Referring more particularly to Fig. 1 of the drawings, the knee type milling machine incorporating the improved elevating mechanism comprises a vertically upstanding column 9 having a forwardly projecting base 10 integrally formed therewith. A hollow work supporting knee 11 is slidably secure to the column 9 by means of interconnecting dovetails (not shown) for selective vertical adjustment above the column base 10 in well known manner. A saddle 12, slidably mounted upon the upper surface of the knee 11 for transverse movement relative to the column, is disposed to support a longitudinally reciprocable table 13. Both manual and power operable means (not shown) are connectable to effect selective transverse movement of the saddle 12 upon the knee, as well as longitudinal movement of the worktable 13 upon the saddle 12. Thus, a workpiece secured to the worktable 13 may be moved in the usual manner relative to a power driven tool spindle 14 journalled in the column. As a consequence, due to movement of the saddle 12 and worktable 13, varying degrees of unbalanced load and torsional deflecting forces are exerted upon the knee 11.

To provide for an equalized vertical adjustment of the knee 11, as well as the slidably superimposed saddle 12 and worktable 13, a pair of spaced apart elevating or translating mechanisms 15 and 16 are operatively interconnected between the knee 11 and the forwardly extending column base 10. To accomplish equalized adjustment, and to resist torsional deflection of the knee 11, a synchronized or timing drive mechanism 17 is operatively interconnected between the left elevating mechanism 15 and the right elevating mechanism 16, thereby insuring simultaneous and equalized operation. The left translating mechanism 15 comprises essentially a vertically upstanding stationary elevating screw 19 secured at its lower end to the base 10 and disposed to threadedly engage a rotatable tubular elevating nut 20 journalled within the knee 11. An electric motor 21, carried within a circular recess 22 formed within the leftward portion of the knee, is positioned in concentric relationship to the elevating mechanism 15 and operatively connected to rotate the tubular nut 20.

Inasmuch as the elevating mechanisms 15 and 16 are of identical construction, only the right mechanism 16 is shown in vertical section, Fig. 1, and will be described in detail. A stationary elevating screw 25 and cooperating rotatable tubular nut 26 comprise the principal cooperating and relatively extensible parts of the right elevating mechanism 16. The elevating screw 25 is keyed at its lower end within a cooperating circular recess formed in the base 10, and is secured thereto by means of a flanged bracket 27. The rotatable tubular nut 26 is greatly elongated with only the extreme lower end being provided with a threaded portion 28 disposed to engage the complementary threaded stationary screw 25. At its upper end, the elongated tubular nut 26 is seated within the inner race of an antifriction bearing 30, the outer race of which is seated within a concentrically bored opening formed within the hollow knee 11. At its lower end, the nut 26 is supported by and keyed to a rotatable support member 31 that is journalled to rotate in a lower antifriction bearing 32. The bearing 32 is retained in operative relationship by means of a flanged support member 33 which is secured directly to the knee 11 in position to engage the outer bearing race. A rotor 36 of the right drive motor 37 is keyed directly to the central portion of the tubular nut 26 and is retained in fixed relationship thereon by means of its upper end abutting a stepped shoulder integrally formed on the nut 26, and its lower end abutting an upwardly extending circular flange integrally formed with the rotatable support member 31. The cooperating stator 38 of the motor 37 is fixedly secured in concentric relationship to the rotor 36 within a circular recess 39 formed within the right portion of the hollow knee 11.

It will be apparent that the elevating mechanism shown and described provides an extremely compact and simplified arrangement for transmitting power from a drive motor to operate an elevating mechanism. The complete dual elevating mechanism, however, comprises the spaced apart vertical elevating mechanisms 15 and 16 respectively connected to be driven by the simultaneously energizable motors 21 and 37. Each of the motors 21 and 37 is approximately one-half of the rated power and capacity of a single motor that would be required to effect vertical movement of a work supporting knee of equal size.

For example, assume a single four horsepower motor would supply sufficient power to elevate a knee and work support, irrespective of whether such a single motor was connected to drive a single elevating mechanism or a dual elevating mechanism, similar to that shown in the drawings. Assuming that the applicant's knee 11 together with the cooperating saddle 12 and worktable 13 would be of comparable size and weight, then the applicant's motors 21 and 37 would each be of two horsepower in order to supply a total of four horsepower for effecting vertical knee movement. In other words, each of the separate elevating mechanisms 15 and 16 together with their associated drive motors 21 and 37 carry a proportionate share of the complete load exerted by the knee 11, saddle 12, and worktable 13. This simplified illustration demonstrates only the proportioning or division of the complete load between the separate spaced apart elevating mechanisms. It will be apparent that the minimum power requirements must be sufficient to support and effect movement of a workpiece (not shown) mounted on the worktable 13 that is within the range of capacity of a particular size milling machine.

To effect an equalized vertical adjustment of the knee, as well as to preclude torsional deflection thereof, the separate tubular nuts 20 and 26 must rotate in synchronism and be maintained continuously in identical positions of angularity relative to each other and to the associated stationary elevating screws 19 and 25. To effect this result, the mechanical synchronizing mechanism 17 is operatively interconnected between the rotatable nut elements 20 and 26. Because of the novel twin motor arrangement, however, the torque or load carrying requirements of the synchronizing mechanism 17 are extremely low. In other words, the mechanism 17 functions primarily as a timing or synchronizing device with the load of the knee being distributed between the motors. As shown in Fig. 1, the synchronizing mechanism 17 comprises essentially an endless cogged type timing belt 42 operatively interconnected between a pair of cooperating cogged pulleys 43 and 44 respectively secured for rotation with the tubular nuts 20 and 26. The right pulley 44 is secured to the rotatable support member 31 by means of cap screws and is keyed to the nut 26 for rotation therewith. In a like manner, the left pulley 43 is fixedly secured to a lower support member 45 journalled in a bearing 48 for rotation with the left tubular nut 20. Each of the pulleys is provided with axially formed teeth or cogs, such as the axial tooth 46 on the pulley 43 for cooperating engagement with axial teeth 47 formed on the inner surface of the endless belt 42. Thus, the cooperative engagement between the timing belt 42 and the pulleys 43 and 44 operates to maintain the tubular nuts 20 and 26 in constant positions of angularity relative to each other, and therefore maintains the elevating mechanisms 15 and 16 in synchronism. A protective flanged housing 49 is secured to the underside of the hollow knee to protect the synchronizing drive mechanism 17.

Figure 2:
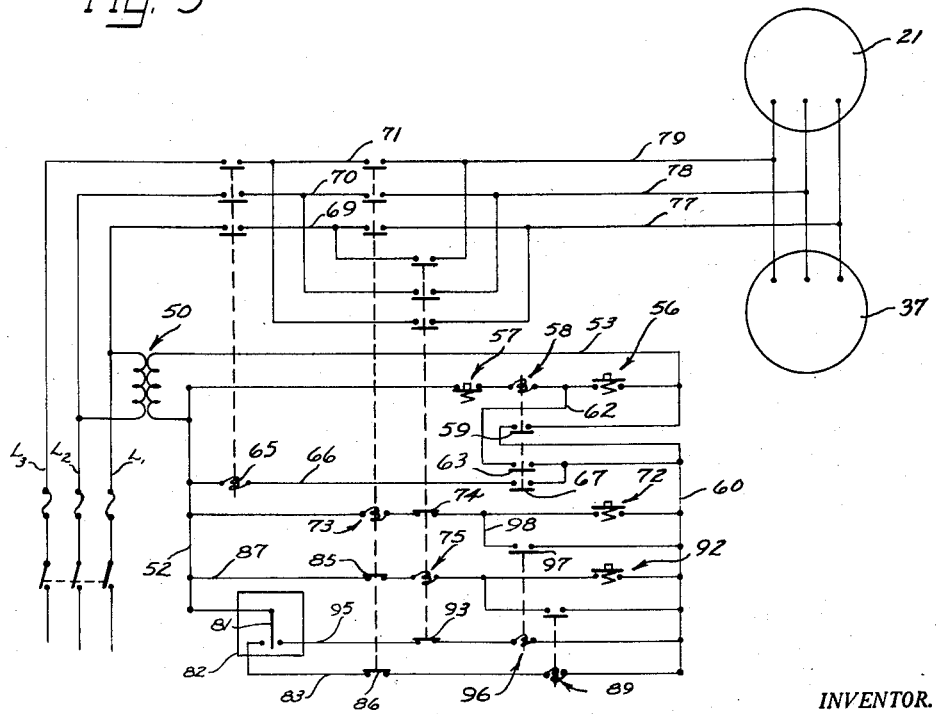
Fig. 2 is a schematic electrical circuit diagram illustrating a control and power supply system for simultaneously energizing the elevating mechanism drive motors for moving the knee.

The elevating mechanism drive motors 21 and 37 are connected to be simultaneously energized or simultaneously braked to a stop by means of a power supply and control circuit, shown in simplified schematic form in Fig. 2. As there shown, electrical power from a three phase source is transmitted via the usual disconnect switch to line conductors $L_1$, $L_2$ and $L_3$. The primary winding of a transformer 50 is connected to receive power from line conductors $L_1$ and $L_2$, the secondary winding thereof being directly connected to energize conductors 52 and 53 of a control circuit for the motors at reduced voltage. Depressing a normally opened push button start switch 56 completes a circuit from the energized conductor 52, through the contact bar of a normally closed stop button switch 57, thence through the coil of a start relay 58, and the contact bar of the start switch 56 to the energized conductor 53. Energization of the relay 58 to upwardly closed position operates to complete a circuit from the energized conductor 53, through the upper closed contact bar 59 of the relay to energize the conductor 60. At the same time, a holding circuit to retain the relay 58 closed is completed via a shunt conductor 62, a closed contact bar 63 of the relay to the energized conductor 60. With the relay 58 in energized closed position, a circuit is likewise completed from the energized conductor 52, through the coil of a power supply relay 65, a conductor 66, and thence through the closed contact bar 67 of the relay 58 to the energized conductor 60. Energization of the power supply relay 65 to upwardly closed position in turn completes a power supply circuit from the line conductors $L_1$, $L_2$ and $L_3$ through the closed contact bars of the relay 65 to energize conductors 69, 70 and 71.

With the relay 58 retained in energized closed position, the motors 21 and 37 may be energized to effect upward movement of the knee 11, Fig. 1, as long as a normally open push button switch 72 is retained in closed position. Retaining the push button switch 72 in closed position completes a circuit from the energized conductor 52, through the coil of an up relay 73, through a normally closed contact bar 74 associated with a reverse or down relay 75, and thence through the closed contact bar of the switch 72 to the energized conductor 60. With the coil of the relay 73 energized, the upper three contact bars thereof are moved to closed position thereby completing circuits from energized conductors 69, 70 and 71 to conductors 77, 78 and 79 respectively connected to effect simultaneous energization of the motors 21 and 37. With the motors 21 and 37 energized to effect upward knee movement, a pivotally movable contact arm 81 of a plugging switch 82 is moved leftwardly to complete a circuit from the energized conductor 52 to a conductor 83. With the up relay 73 energized to effect upward knee movement, a pair of normally closed lower contact bars 85 and 86 associated therewith are retained in upward open position to respectively interrupt circuits from an energized conductor 87 and the energized conductor 83.

As soon as the switch 72 is released, the control circuit for retaining the relay 73 energized is interrupted, permitting the contact bars associated therewith to return to their normal positions in a manner to simultaneously de-energize the motors 21 and 37 as well as plug or brake them to a stop. The plugging circuit for stopping the motors is completed from the energized conductor 52, the leftwardly moved contact bar 81, conductor 83, via closed contact bar 86, and thence through the coil of a stop relay 89 to the energized conductor 60. With the stop relay 89 energized, a circuit is then completed from the energized conductor 87, via the normally closed contact bar 85 of the relay 73 thence through the coil of the down relay 75, and the closed contact bar of the relay 89 to the energized conductor 60. With this condition existing, the upper three contact bars associated with the down relay 75 are moved upwardly to closed position thereby completing a circuit from energized conductors 69, 70 and 71 to energize conductors 79, 78 and 77 to effect a momentary reverse energization of the motors 21 and 37. Simultaneous stopping or braking of the motors 21 and 37 in response to momentary reverse energization permits the movable contact arm 81 to resume its neutral position as shown in Fig. 2, thereby interrupting the plugging circuit from the energized conductor 52 through the coil of the relay 89.

To effect reversed rotation of the motors 21 and 37 for moving the knee downwardly, a normally open start button switch 92 is depressed to complete a circuit from the energized conductor 52, via conductor 87, closed contact bar 85, the coil of the down relay 75, and the closed contact bar of switch 92 to the energized conductor 60. With the reverse or down relay 75 energized, the contact bar 74 and a lower contact bar 93 are moved to open positions. Likewise, the three upper contact bars associated with the relay 75 are moved to upwardly closed position, thereby completing a power supply circuit from conductors 69, 70 and 71 to conductors 79, 78 and 77 respectively.

With the down start button switch 92 retained in depressed position, the movable contact bar 81 associated with the plugging switch 82 is moved rightwardly to complete a circuit from the energized conductor 52 to a conductor 95. Upon releasing the start button switch 92, the upper contact bars of the relay 75 are moved to open position thereby de-energizing the motors 21 and 37. At the same time, the contact bars 74 and 93 of the reverse or down relay 75 resume their normally closed positions, at which time a plugging circuit is completed from the energized conductor 95, the closed contact bar 93, through the coil of a stop relay 96 to the energized conductor 60. Upward movement of the energized stop relay 96 effects closure of a contact bar 97 to complete a circuit from the energized conductor 52, the coil of the up relay 73, closed contact bar 74, a shunt conductor 98, and thence through the closed contact bar 97 to the energized conductor 60.

Energization of the up relay 73 effects closure of the three upper contact bars associated therewith to energize conductors 77, 78 and 79 to effect immediate stopping or braking of the motors 21 and 37. As soon as the motors 21 and 37 have been braked to a stop, the plugging circuit is interrupted by movement of the movable contact bar 81 to its central neutral position. It will be apparent that there has been provided a simplified control circuit for energizing the motors 21 and 37 to effect vertical knee movement in either direction, as well as immediately stopping or braking the drive motors to stop the knee in a selected vertically adjusted position above the column base.

Figure 4:
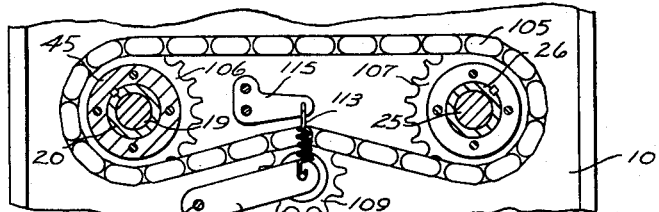
Figure 3:
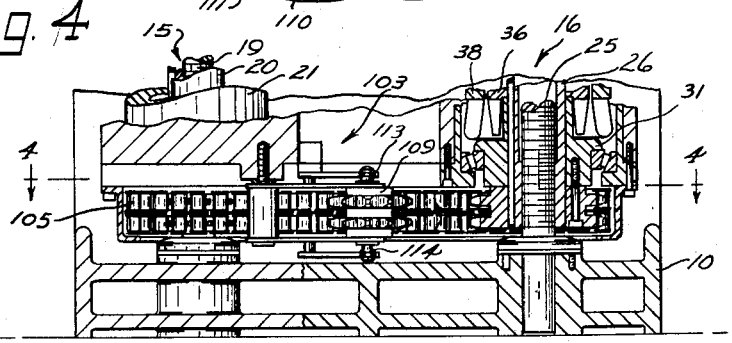
Fig. 3 is an enlarged fragmentary view in vertical longitudinal section through the column base and a portion of the knee structure, and illustrating a modified timing arrangement for synchronizing movement of the spaced apart elevating mechanism; and, Fig. 4 is a fragmentary view in horizontal section of the modified synchronizing mechanism, and taken generally along the lines 4—4 in Fig. 3.

In a modified form of the invention, as shown in Figs. 3 and 4, a roller chain and sprocket synchronizing drive 103 is connected to effect synchronism between the left elevating mechanism 15 and the right elevating mechanism 16. To accomplish this, a roller bearing link chain 105 is operatively interconnected to engage sprockets 106 and 107 that are in turn secured for rotation with the tubular, rotatable nuts 20 and 26. To maintain the roller chain 105 in proper lash free engagement with the associated sprocket wheels 106 and 107, the forward stretch of the roller chain is engaged by a resiliently biased idler sprocket 109. The idler sprocket 109 is journalled at one end of a movable arm 110 that is pivotably secured to a bearing 111 at its opposite end, and that is in turn secured to the knee as shown in Fig. 3. Springs 113 and 114 connected at one end to the swinging end of the pivotable arm 110, are in turn secured at their opposite ends to a bracket 115 secured to the knee 11. By means of the roller chain engagement, the sprockets 106 and 107 are adapted to retain the tubular elevating nuts 20 and 26 respectively in identical positions of angularity relative to each other and the associated stationary elevating screws 19 and 25. Thus, the elevating mechanisms 15 and 16 are operated in exact synchronism for effecting an equalized vertical adjustment of the knee and are adapted to resist torsional deflection thereof.

While the invention has been shown and described as applied to the vertically movable knee of a milling machine, it is to be understood that the novel features thereof may be incorporated with equal advantage in other major, relatively movable members of a machine tool. Although particular structures have been shown and described in considerable detail as exemplary of the manner in which the invention may be practiced, it will be apparent to those skilled in the art to which this invention relates that various modifications of the structures herein shown may be effected without departing from the spirit and scope of the invention as defined in the subjoined claims.

The principles of this invention having now been fully explained in connection with the foregoing description, I hereby claim as my invention:

1. In a milling machine, a vertically upstanding column provided with a forwardly projecting base, a knee slidably carried by said column for vertical movement above said base said knee being provided on its underside with a pair of spaced apart enlarged circular openings defining the lower ends of upwardly extending spaced apart bored openings disposed in parallelism and extending upwardly into said knee, a pair of circular flanged support members removably secured to the underside of said knee in position to encircle the openings formed therein, a pair of slidably superimposed work supports carried by said knee for relative horizontal movement in mutually perpendicular planes relative to said column, a pair of spaced apart selectively extensible elevating mechanisms operatively interconnected between said knee and said base said mechanisms comprising a pair of screws secured at the lower ends to said base and a pair of cooperating elongated tubular nuts journalled at their upper and lower ends to rotate in said knee, a pair of lower bearings having their inner races respectively disposed to rotatably support the lower ends of said nuts and their outer races respectively retained in operative position by said flanged support members, a pair of separate simultaneously actuatable motors respectively connected to directly drive said elevating mechanisms for effecting an equalized vertical movement of said knee relative to said base said motors comprising rotors respectively secured to the central portions of said nuts and cooperating stators respectively fitted within the enlarged bored openings in said knee, said stators being retained in position by said flanged support members, a control system including a source of energizing power connectable to actuate said motors for simultaneous rotation in a selected direction, and an endless cog type timing belt operatively interconnected between the rotors of said motors to maintain said tubular nuts in synchronism.

2. In a machine tool, a pair of members carried for relative rectilinear movement, the first one of said members being provided with a pair of enlarged bored openings disposed in spaced apart parallelism in a plane parallel to the path of rectilinear member movement, a pair of screw and nut type translating mechanisms operatively interconnected between said members adapted to effect relative rectilinear movement therebetween, said mechanisms comprising a pair of elongated tubular nuts journalled to rotate in the enlarged bored openings formed in the first of said members and a pair of cooperatively disposed screws secured at their opposite ends to said second member, a pair of selectively energizable motors carried by one of said members, each motor of said pair of motors being constructed and arranged so as to encircle an individual one of said translating mechanisms with the rotor of each of said motors being directly connected to drive the associated translating mechanism to effect its operation and the cooperating stator of each of said motors being fitted within one of the enlarged bored openings in said knee, each motor of said pair of motors being so limited in its output power as to provide only one-half the power required to effect relative movement between said members, a pair of flanged support members removably secured to said knee in a position to retain the stators within the bored openings in said knee, a pair of antifriction bearings having outer races retained in position by said flanged support members, said bearings being provided with inner races respectively disposed to rotatably support the lower ends of said nuts, a resilient cogged timing drive operatively interconnecting said nuts of said translating mechanisms to maintain said translating mechanisms in synchronism, said resilient drive being so limited in its power transmitting capacity as to be inadequate to transmit sufficient power for effecting relative movement between said members, and an electrical control system connectable to effect simultaneous actuation of said motors for effecting a substantially synchronized operation of said nuts to provide an equalized relative rectilinear movement between said members, whereby said translating mechanisms are operated in synchronism due to the resilient mechanical interconnection effected by said timing drive irrespective of any slight fluctuations in the synchronism effected by said electrical control system to effect equalized relative movement between said members and the load is distributed proportionally between said motors.

3. In a machine tool, a first and second member carried for relative rectilinear movement, a pair of screw and nut type translating mechanisms operatively interconnected between said members in spaced apart parallelism, said translating mechanisms comprising rotatable elements journalled in the first of said members and threadedly engaged cooperating nonrotatable elements fixedly secured to the second of said members, a pair of motors carried by one of said members and being provided with rotors positively secured to said rotatable elements for rotation therewith, said motors being of such limited output power as to respectively provide approximately one-half the total power required to drive both of said rotatable elements for effecting relative movement between said members, an energizable control circuit operatively connected to energize said motors for effecting a substantially synchronized rotation of said rotors, and a resilient timing belt positively interconnected between said rotors having sufficient torque transmitting capacity to maintain said rotors and said rotatable elements in positions of identical angularity whereby an equalized relative movement is effected between said members due to the cooperative coaction between the substantial synchronism effected by said control circuit and by the positive synchronism effected by said resilient timing belt.

References Cited in the file of this patent

UNITED STATES PATENTS

| | | |
|---|---|---|
| 461,202 | Pentz | Oct. 13, 1891 |
| 1,371,772 | Blood | Mar. 15, 1921 |
| 1,444,591 | Daly | Feb. 6, 1923 |
| 1,847,446 | Robinson | Mar. 1, 1932 |
| 1,889,930 | Morton | Dec. 6, 1932 |
| 2,375,172 | Arter | May 1, 1945 |
| 2,736,243 | Armitage | Feb. 28, 1956 |